No. 792,939. PATENTED JUNE 20, 1905.
J. P. SNEDDON.
FEED WATER PURIFIER.
APPLICATION FILED NOV. 11, 1904.
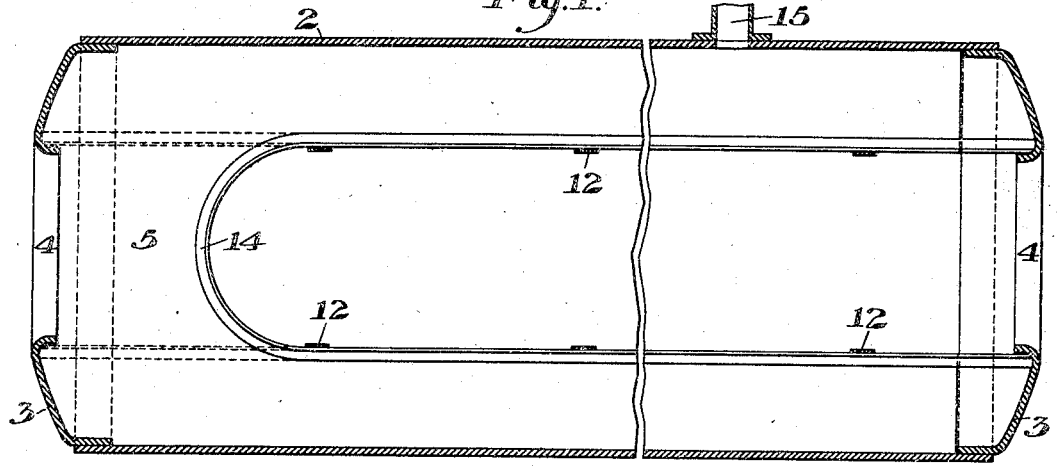
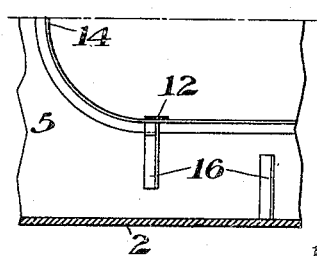
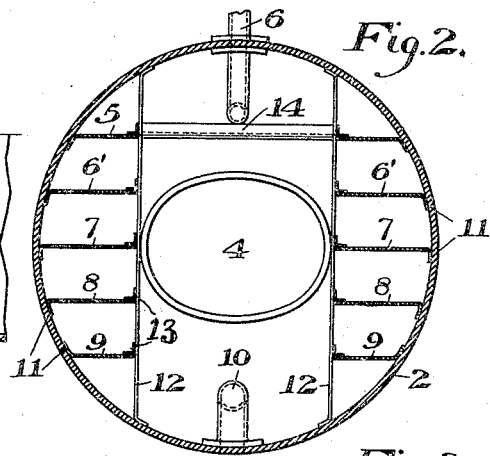
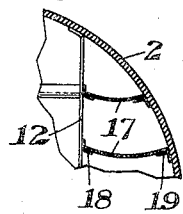
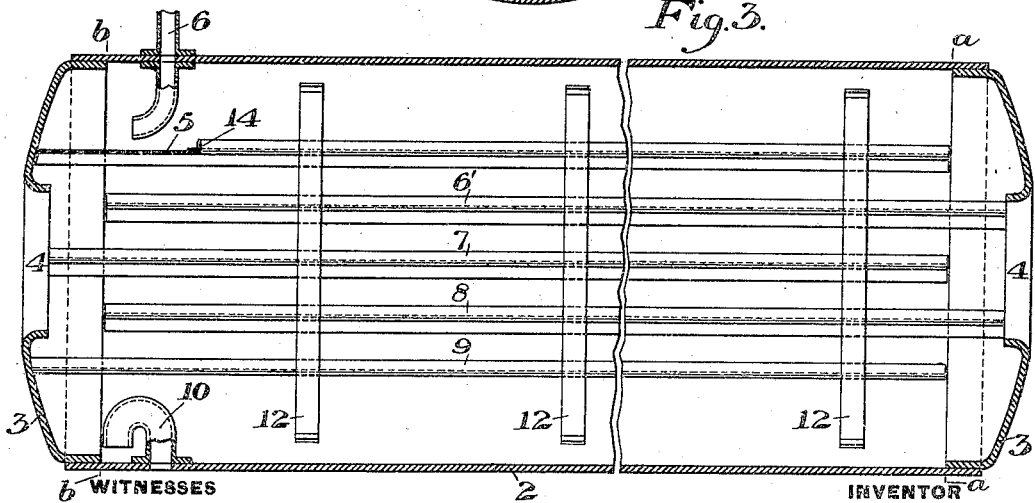
WITNESSES
Warren W. Swartz
H. M. Corwin
INVENTOR
James P. Sneddon
by Bakewell & Byrnes
his Attorneys No. 792,939.                                                          Patented June 20, 1905.

UNITED STATES PATENT OFFICE.

JAMES P. SNEDDON, OF BARBERTON, OHIO, ASSIGNOR TO THE STIRLING COMPANY, OF CHICAGO, ILLINOIS, A CORPORATION OF NEW JERSEY.

FEED-WATER PURIFIER.

SPECIFICATION forming part of Letters Patent No. 792,939, dated June 20, 1905.

Application filed November 11, 1904. Serial No. 232,372.

*To all whom it may concern:*

Be it known that I, JAMES P. SNEDDON, of Barberton, Summit county, Ohio, have invented a new and useful Feed-Water Purifier, of which the following is a full, clear, and exact description, reference being had to the accompanying drawings, forming part of this specification, in which—

Figure 1 is a sectional plan view of my improved purifier. Fig. 2 is a vertical cross-section of the same. Fig. 3 is a vertical longitudinal section, and Figs. 4 and 5 are detail views of modifications.

My invention relates to that class of feed-water purifiers wherein steam is employed, and is designed to provide for distributing the water in thin streams to facilitate precipitation of the scale-forming materials, also to provide water-trays which are easily accessible for cleaning and inspection and to reduce the time for purifying with live steam and provide a cheap and strong structure.

In the drawings, 2 represents a cylindrical drum with heads 3 3 secured at its ends, one or both of these heads being provided with a central manhole 4, through which a man may enter the drum to clean and inspect the trays. The trays extend longitudinally within the drum at the side portions, and the top tray 5 is preferably of U shape, as shown in Fig. 1, the end portion of the U shape being provided to receive the feed-water entering through the inlet-pipes 6, as shown in Fig. 3. The water flows slowly along the legs of this U-shaped tray to their ends, which terminate on the line *a a* of Fig. 3. It then overflows into the second tray 6', which has two side legs or shelves extending from the right-hand end of the purifier to the line *b b* at the left-hand end. It then overflows upon the third tray 7, which is preferably close against the left-hand end of the drum and terminates at the line *a a*, and so on, over the successive trays shown at 8 and 9. The water then collects in the bottom of the drum and flows out through the outlet-pipe 10, which may be curved, as shown, or of any desirable form.

The outer edges of the trays may be flanged downwardly and riveted to the shell, as shown at 11, while their inner edges may be supported on vertical standards or bars 12 by the angle-irons 13, which inclose the edges of the trays. On the top tray this angle-iron extends around the end portion of the U, as shown at 14 in Fig. 1.

Steam is admitted through the pipe 15 of Fig. 1, preferably of full boiler-pressure.

In the operation of the device the water flows slowly back and forth from one end of the drum to the other at successively lower levels, so that during this time interval it will have been raised to nearly the temperature of the steam. Scale-forming material will thus be effectually removed, as the long travel of the water over the large surface of the pans while exposed to steam will cause a rapid precipitation of solids insoluble at the high temperature reached. The water accumulates in the bottom of the drum and rests there for sufficient time to be purified and ready to enter the boiler.

In order to increase the distance through which the water flows and cause more intimate contact with the steam, I may provide barriers 16, as shown in Fig. 4 in the trays, to give the water a more circuitous path.

Instead of making the trays with flat bottoms I may dish or curve them, as shown at 17 in Fig. 5, and in order to make them easily removable I may removably support them upon the angles 18 and 19 shown in this figure.

The advantages of my invention result from the efficient heating of the feed-water, causing a quick and thorough precipitation of the scale-forming materials. The water flows slowly in thin streams over the trays through a long path, giving intimate and thorough contact with the steam.

The drum is open through the center, so that a man may enter through the manhole and clean and inspect any or all of the parts. The time for cleaning is greatly reduced over that in other types of live-steam purifiers. The structure is also cheap and well adapted to resist pressures.

Variations may be made in the form and arrangement of the drum, trays, &c., without departing from my invention.

I claim—

1. A feed-water purifier, comprising a drum having a longitudinal unobstructed passageway, water-receiving trays at one side of said chamber, said drum having a manhole giving access to the chamber, and a water inlet and outlet.

2. In a water-purifier, a drum having water-trays extending along the side portions of its interior, with an unobstructed passageway between the two sets of trays, and a manhole arranged to give entrance to the passageway.

3. A feed-water purifier, comprising a drum having a longitudinal unobstructed passageway therein, and a manhole giving access to said passage-way, and a vertical series of water-receiving trays at one side of said passageway and extending alternately from each end to a point near the other end to cause the water to flow back and forth in the successive trays.

4. In a feed-water purifier, a drum having sets of trays on opposite sides with an unobstructed passage-way between them, a manhole in the head giving access to said passageway, the trays being arranged to cause the water to flow back and forth longitudinally of the drum, and means for feeding water to both of the upper trays.

5. In a feed-water purifier, a drum containing a U-shaped upper tray, and trays at successively lower levels arranged in two groups on opposite sides and arranged to cause back and forth flow of the water longitudinally of the drum.

6. In a feed-water purifier, a drum having an open unobstructed passage-way extending longitudinally through it, and water-trays on at least one side thereof, said trays being removably carried on suitable supports.

7. In a feed-water purifier, a cylindrical drum having a central manhole in at least one head, two vertical series of trays arranged at opposite sides on the interior of the drum and alternately terminating short of each head, said trays being arranged to leave an unobstructed passage-way between them, means for supplying water to the upper trays, a water-outlet at the bottom of the drum, and a steam-inlet in the top portion of the drum.

8. In a feed-water purifier a drum or receptacle containing a substantially U-shaped upper tray, a single feed-channel arranged to feed the water into the cross portion of said tray, and trays arranged in two groups at successively lower levels to successively receive the water from the upper tray.

9. In a feed-water purifier, a receptacle containing a U-shaped upper tray, and trays arranged at lower levels in two groups below the legs of the upper tray.

In testimony whereof I have hereunto set my hand.

JAMES P. SNEDDON.

Witnesses:
J. E. BELL,
JOHN PRENTICE.